United States Patent [19]
Nowak et al.

[11] Patent Number: 5,837,739
[45] Date of Patent: Nov. 17, 1998

[54] LOADED SYNTACTIC FOAM-CORE MATERIAL

[75] Inventors: Gregory P. Nowak, Belleville, Ill.; Alan F. Tegeler, O'Fallon; Tracy L. Timmons, Maryland Heights, both of Mo.

[73] Assignee: McDonnell Douglas Corporation, St. Louis, Mo.

[21] Appl. No.: 766,417

[22] Filed: Dec. 12, 1996

Related U.S. Application Data

[63] Continuation-in-part of Ser. No. 480,778, Jun. 7, 1995.

[51] Int. Cl.⁶ .................. C08J 9/28; C08J 9/32; C08J 9/35
[52] U.S. Cl. .................. 521/54; 521/63; 521/64; 521/154; 521/178; 521/184; 523/219
[58] Field of Search .................. 521/54, 63, 64, 521/154, 178, 184; 523/219

[56] References Cited

U.S. PATENT DOCUMENTS

| | | | |
|---|---|---|---|
| 3,849,350 | 11/1974 | Matsko | 260/2.5 B |
| 3,856,721 | 12/1974 | Fritschel | 260/2.5 B |
| 4,410,639 | 10/1983 | Bouley et al. | 521/54 |
| 4,412,012 | 10/1983 | Bouley et al. | 521/54 |
| 4,482,590 | 11/1984 | Bouley et al. | 428/35 |
| 4,548,861 | 10/1985 | Barnes et al. | 428/233.7 |
| 4,568,603 | 2/1986 | Oldham | 428/195 |
| 4,595,623 | 6/1986 | Du Pont et al. | 428/195 |
| 4,861,649 | 8/1989 | Browne | 428/240 |
| 4,956,393 | 9/1990 | Boyd et al. | 521/54 |
| 5,120,769 | 6/1992 | Dyksterhouse et al. | 521/54 |
| 5,135,959 | 8/1992 | Hill | 521/54 |
| 5,167,870 | 12/1992 | Boyd et al. | 525/540 |
| 5,185,381 | 2/1993 | Ruffoni | 521/52 |
| 5,252,632 | 10/1993 | Savin | 523/137 |
| 5,356,958 | 10/1994 | Matthews | 523/219 |

*Primary Examiner*—Morton Foelak
*Attorney, Agent, or Firm*—Howell & Haferkamp, LC

[57] ABSTRACT

A syntactic foam-core material and method for its production are disclosed wherein glass microspheres and chopped fiberglass are dispersed within a slurry comprised of a suitable resin such as an epoxy and a suitable solvent such as methyl ethyl ketone. Under carefully controlled vacuum and rate of addition conditions, the microspheres and chopped fiberglass are added to the slurry to form a light weight syntactic foam-core material. The material may either be stored under cold conditions for use at a later time as a B-stage material or it may be shaped and/or molded to conform to a desired configuration which, for example, may correspond with a desired component part. After curing, the material may be machined to final dimensions. The material may be characterized as a tightly packed network of resin-coated microspheres spaced by controlled, yet random voids comprising at least 20%, and more usually, between 23 and 25% by volume, of the fully-cured material.

24 Claims, 8 Drawing Sheets

LOADED SYNTACTIC FOAM-CORE MATERIAL

RELATED APPLICATIONS

This application is a continuation-in-part of U.S. application Ser. No. 08/480,778, filed Jun. 7, 1995, and entitled "Loaded Syntactic Foam-Core Material".

BACKGROUND OF THE INVENTION

This invention relates, generally, to a syntactic foam-core composite and, more particularly, to a syntactic foam-core material characterized by ultra-low density, broad temperature range utility, electromagnetic attenuation tailorability, low cost and convenient manufacture.

Foam-core composites are used widely in industry in an array of practical applications. For example, because of the light weight and expanded cellular structure which characterize these materials, they are used extensively as thermal, electrical and acoustical insulators and as filler materials.

Further, a trend has developed to substitute lighter and less dense materials such as aluminum and related alloys in structural applications which once required iron and steel. This trend continues in that lower density synthetic materials and composites which are desirable due to their strength and resistance to impact are now being combined with and often substituted for structural materials such as aluminum and metal alloys. In this regard, foam-core composites have found particular beneficial application in aerospace applications where low density materials are particularly beneficial.

Reticulated honeycomb and blown-foam materials have preceded foam-core composites as first and second generation synthetic materials, respectively, which have been widely used as structural materials in the aerospace industry.

First generation reticulated honeycomb materials generally have been polymeric materials manufactured in sheet form. These materials derived their low density, and thus their desirability, principally from the numerous open spaces or voids that separate the interconnected walls of the material. The reticulated honeycomb material functions well as a structural filler particularly when sandwiched and adhesively bonded between planar facing sheets or skin materials.

However, reticulated honeycomb also has shortcomings, such as its resistance to deformation. Because the material is only slightly bendable, it is unsuitable, without modification, for use in applications requiring complex shaping and acute bending as is commonly required of component parts used in aerospace applications such as intake and exhaust ducting and the like. Adapting reticulated honeycomb to such applications where complex shaping and acute bending is required has previously required that the material be "stress-scored" to make it conformable. Scoring honeycomb, however, diminishes the integrity and strength of the material and often requires that a cementitious filler be applied within the score to restore some of the structural integrity of the honeycomb. The inclusion of filler materials of this sort are not altogether desirable in that they present the possibility of delamination with the passage of time and can also impart undesirable electrical properties to the overall component in which the honeycomb is used.

The second generation expanded foam-core materials typically comprise synthetic thermoplastic resins which include polyurethane foams and expanded polystyrene. These expanded or "blown" foams achieve their open, macrocellular structure usually by incorporation of a volatile blowing agent such as pentane which causes the material to expand when sufficiently heated.

Although expanded foams have demonstrated desirable strength and insulating characteristics, such materials are generally resistant to shape conformation as is the honeycomb. Thus, expanded foams are usually best suited for applications requiring a flat, sheet material.

Another drawback relating to expanded foams relates to their tendency to expand and contract when exposed to humid and arid conditions, respectively. This sponge-like behavior is undesirable as it causes the material to increase in weight and density substantially when wet and, with repeated expansion and contraction, often results in material disintegration and delamination from facing materials to which the forms are typically adhered.

Syntactic foams are third generation materials which are believed to provide substantially improved characteristics when compared to the features associated with predecessor synthetic structural and filler materials as described above.

Generally, syntactic foams are composite materials comprised of rigid, hollow microspheres which are adhered to one another by a bonding agent. Syntactic foams differ from blown foams, such as polystyrene foam or polyurethane foam, in that the cells of syntactic foams are formed by the incorporation of small diameter, rigid microspheres into a bonding agent (typically a resin binder) rather than by expansion of the foamed material by a volatile blowing agent such as pentane. Further, voids are created between the microspheres provided that the bonding agent does not completely fill these spaces.

The bonding agents typically used in making syntactic foams are either thermosetting resins or thermoplastic resins. Examples of the thermosetting resins used as bonding agents include epoxy resins, bismaleimides, cyanates, unsaturated polyesters, noncellular polyurethanes, thermosetting polyimides and the like. Typical examples of thermoplastic resins used as bonding agents include polyaryletherketones, polyphenylenesulfide, polyimides, polyetherimides and aromatic and aliphatic nylons.

Microspheres, which are also referred to as microbubbles, are generally rigid, hollow spheres of glass, carbon, polystyrene or phenolic resins. Among the most commonly used hollow spheres are glass microspheres which are available commercially in particle densities ranging from about 0.1 to about 0.6 gm/cc and diameters within the range of about 5 to about 200 microns.

Methods are known in the art for making "loaded" syntactic foam-core materials which have increased radar absorption capability. The loaded materials are formed of dielectric materials which are presented in a characteristic web-like structure that enhance the overall radar absorption of the material.

Typical syntactic foam materials from the prior art incorporate microspheres in resin to reduce the density from 1.2 g/cc to approximately 0.6 to 0.9 g/cc and are generally void-free. This lightweight material must still have good structural property, but its main focus is to reduce product cost via cheap fillers. Voids have generally been believed to be undesirable because it has been widely felt that the voids reduce compressive and shear strength.

Various disclosures of prior art syntactic foam-core materials and the methods for making these materials are provided in the following U.S. patents: U.S. Pat. No. 4,410,639 to Bouley, et al.; U.S. Pat. No. 4,412,012 to Bouley, et al.; U.S. Pat. No. 4,482,590 to Bouley, et al.; U.S. Pat. No. 4,548,861 to Barnes, et al.; U.S. Pat. No. 4,568,603 to Oldham; U.S. Pat. No. 4,595,623 to Du Pont, et al.; U.S. Pat. No. 4,861,649 to Browne; U.S. Pat. No. 4,956,393 to Boyd, et al.; U.S. Pat. No. 5,120,769 to Dyksterhouse, et al.; U.S. Pat. No. 5,135,959 to Hill; U.S. Pat. No. 5,167,870 to Boyd, et al.; U.S. Pat. No. 5,185,381 to Ruffoni; U.S. Pat. No. 5,252,632 to Savin; and U.S. Pat. No. 5,356,958 to Matthews. All of the foregoing patents are herein incorporated by reference.

The related references in the art indicate that considerable effort has been directed toward formulating strong and low density syntactic foam-core materials which are capable of being loaded with electromagnetic attenuating fillers. None of the above-identified disclosures, however, reveals a highly shape-mutable syntactic foam-core material that is characterized by high strength, ultra-low density, broad temperature range utility and electromagnetic attenuation tailorability and which is relatively simple and inexpensive to produce and does not require sophisticated manufacturing equipment. Thus, the related art notwithstanding, a need which is unsatisfied by known technology exists within the art for the present invention which accomplishes these and other advantageous objectives.

SUMMARY OF THE INVENTION

Briefly, therefore, the present invention is direct to a novel syntactic foam-core material and method for making same. The material is prepared by thoroughly combining a resin, a solvent and microspheres in a closed system mixer to form a slurry in which the resin, solvent and microspheres are substantially uniformly dispersed. This material may be stored or processed to either an intermediate or a fully cured state by either partially or fully extracting the solvent from the mixture. Further, various adjuvants including carbon particles may be added to the slurry to alter the properties of the fully cured composite.

Among the several advantages found to be achieved by the present invention, therefore, may be noted the provision of a substantially reduced density syntactic foam-core composite; the provision of an uncured material which may be stored for more than five years without adverse effects; the provision of a partially cured material which may be stored for more than one year without adverse effects; the provision of a partially cured material which is sufficiently pliable for manipulation to a final shape prior to full curing; and the provision of a material which is tailorable to various electromagnetic attenuations, costs and useful temperature ranges.

The syntactic foam material described herein is useful as a lightweight, low-cost alternative to honeycomb for structural core in aerospace applications. Electrical properties may be tailored for various applications with electromagnetic loading. Unloaded versions are suitable for conventional and commercial applications. It is compatible with laminate pre-pregs and adhesives of similar temperature range and cure, and can reduce manufacturing time and cost, including the costs of prototyping, because the material requires minimum tooling, and can be formed to a near-net shape, staged and cured to net shape, or easily machined from billet form.

BRIEF DESCRIPTION OF THE DRAWINGS

Further objects and features of the present invention are revealed in the following Detailed Description of the Preferred Embodiment of the invention and in the drawing figures wherein.

DETAILED DESCRIPTION OF THE PREFERRED EMBODIMENT

Figure 1:
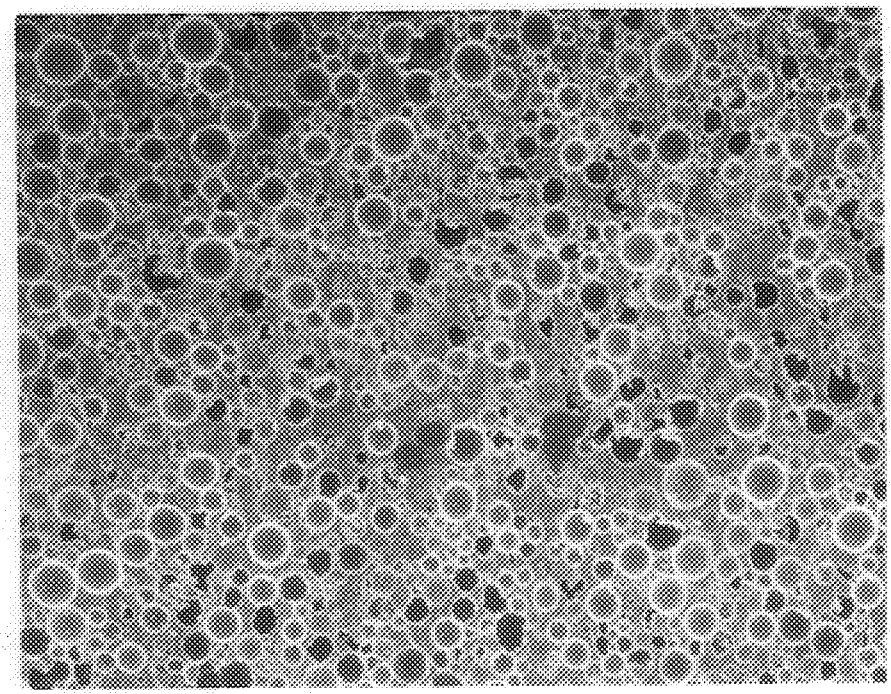
FIG. 1 is a photomicrograph taken a 100 times magnification showing the structure of a syntactic foam-core material of the present invention.

In accordance with the present invention, it has been discovered that combining resin with a solvent and microspheres and extracting the solvent produces a syntactic foam-core material having a lower density than do typical prior art syntactic materials, presumably because random voids are formed between adjacent microspheres as the solvent is extracted. Surprisingly, it has also been found that partially extracting the solvent by vacuum and heating the material to partially advancing the resin produces a pliable "B staged" material which may be stored for more than one year before being formed to a desired shape and extracting the remainder of the solvent. The material may be cast into a billet for later machining, molded to near net shape, formed into sheets or other stock shapes, or produced as a B staged material which may be stored for later use.

In accordance with the present invention, starting materials include a suitable resin, microspheres and solvent. The resin and microspheres may be those used in the prior art techniques as described in the U.S. patents cited above. The resin is preferably a synthetic organic resin such as an epoxy, a cyanate ester or a polyimide resin. However, silicones, bismaleimides, and other thermosetting and thermoplastic resins can be used. The microspheres may be any available microspheres such as polymer, glass, quartz or carbon spheres and are preferably hollow glass spheres which are filled with a gas such as carbon dioxide and which have a diameter between about 5 and about 200 microns. The solvent may be selected from among a wide variety of liquids and particularly from among organic solvents. Preferred solvents include methyl ethyl ketone (MEK), aliphatic naphtha, methanol and methyl 2-pyrrolidinone.

If desired, chopped fiberglass may be combined with the resin, solvent and microspheres to inhibit propagation of cracks. Other adjuvants may also be added to the resin systems if desired. Ordinarily skilled artisans will readily understand which adjuvants to select and what relative proportions to add. Examples of these adjuvants include nadic methyl anhydride (NMA), which is a high temperature stabilizer that enables the material to withstand higher temperatures without degradation. Rubber tougheners may also be added to increase the toughness of the material and to make it less brittle and more impact resistant. Further, flame retardants such as brominated compounds and in particular BC-58 available from Great Lakes Chemical Company may be added to resist ignition of the syntactic foam-core material.

Also, as will be explained in greater detail below, a particulate carbon filler such as EC 600JD Ketjen Black may be added to enhance the dielectric properties which in turn reduces the radar absorptivity of the material for low observable (LO) applications such as "stealth" aircraft. Ketjen is a U.S. federally registered trademark of the Akzo Chemical B.V. The particulate carbon may be ultrasonically dismembrated in a compatible low-viscosity medium prior to being added to the syntactic form-core material to create tailored, radar absorbing structure for low observable treatments. Still further, other fillers may be added such as inorganic compounds, metals, metal oxides, pyrolized graphite, precision cut carbon fibers and other exotic materials. Generally speaking, the raw materials used in the preparation of the syntactic foam material, whether for the unloaded or loaded variety, should preferably be stored in double plastic bags, metal, plastic, or glass containers that are sealed to prevent absorption of atomspheric moisture. Absorbed moisture should be kept to 1% or less because it can otherwise shorten mixed material storage life and may cause premature curing of the syntactic foam material.

Although many different resins, solvents, microspheres, and additives may be used to produce the composite material, the relative proportions of the constituents before final extraction of the solvent are the same to produce an unloaded syntactic foam, namely 50 to 60 parts by total solids content weight of resin, 35 to 43 parts by total solids weight of microspheres, and about 7 to about 10 parts by total solids weight of solvent, and, optionally, 0 to 10 parts by total solids content weight of chopped fiberglass. (Hereinafter, for the sake of brevity, "parts by weight" as used in the description and the claims shall mean "parts by total solids weight.") More desirably, the relative proportions are 53 to 58 parts by weight resin, 39 to 42 parts by weight microspheres, about 7 to about 10 parts total solids content by weight solvent and, optionally, 1 to 5 parts by weight chopped fiberglass. Most preferably, the relative proportions are about 56 parts by weight resin, about 41 parts by weight microspheres, about 8 parts total solids content by weight solvent and, optionally, about 3 parts by weight total solids content chopped fiberglass. It should be understood that these ratios have been found to be optimal for reduced material density, but other proportions are also intended to be within the scope of this invention.

If a loaded syntactic foam is desired, up to 12 parts by weight electromagnetic media such as carbon particulate may optionally be added, but if electromagnetic media are added, an additional portion of solvent is required in a quantity by weight of about 20 times the amount of electromagnetic media and an additional solvent extraction step may be required, as described in more detail below.

Figure 4:
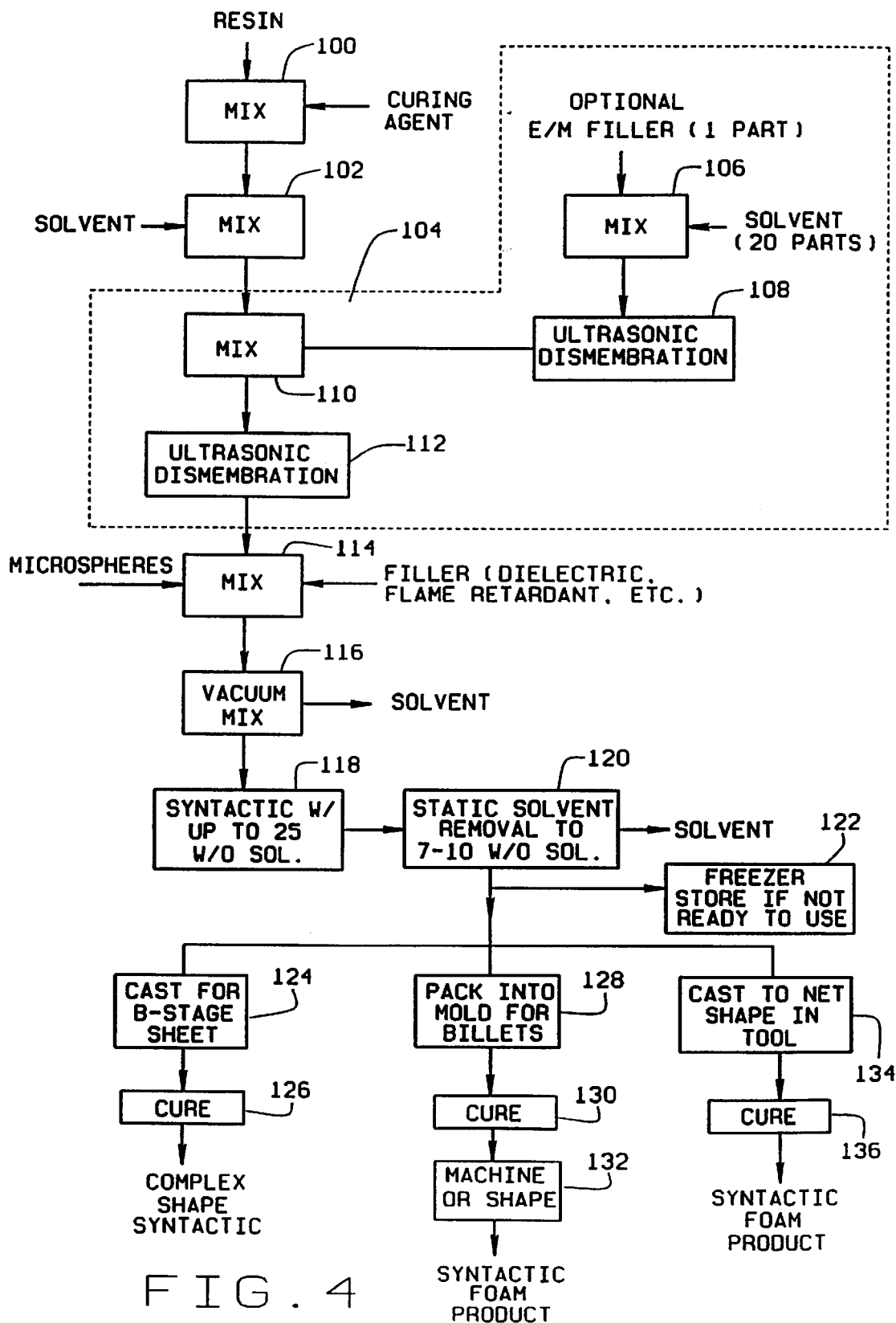
FIG. 4 is a flow chart showing a method by which syntactic foam-core material may be produced in accordance with the invention.

In particular, the syntactic foam-core material may be produced as follows, with reference made to the steps in the flow chart of FIG. 4. Resin and a suitable curing agent are mixed together at step 100 to produce a system corresponding to about 50 to 60 parts by weight, and preferably 53 to 58 parts by weight, and even more preferably about fifty-six parts by weight of the total solids content to be in the mixture. The mixed resin and curing agent system is mixed together with between 7 to 10 and preferably about 8 parts by total solids content weight of a solvent for the resin by stirring in a closed system to form a viscous liquid at step 102.

If an electromagnetic media filler is not used (i.e., an unloaded syntactic foam is desired), the output of step 102 becomes the input to step 114. Otherwise, steps 106, 110, and 112 are performed, and perhaps also step 108, depending upon the viscosity of the material produced in step 102. The addition of the electromagnetic media in step 106 is performed to alter the dielectric properties of the syntactic foam-core material.

In step 106, a mixture of up to 12 parts by total solids weight of electromagnetic filler is added to and thoroughly mixed with a portion of solvent for the resin 20 times greater, by weight, than the amount of electromagnetic filler. (For example, if 3 parts by total solids weight of electromagnetic filler is used, 60 parts by total solids weight of solvent is mixed with the electromagnetic filler material.) The composition of the solvent (or solvent system) used in step 106 can be the same as that used in step 102, but need not be. However, it is required is that the solvents (or solvent systems) used in the steps be compatible with one another and with the base resin, i.e., they do not chemically react with one another and are miscible with one another in the amounts used in the process. Furthermore, the solvent or solvent system used in step 106 must have low surface energy, i.e., it must thoroughly wet the filler, so that the pieces of filler are separated and fill the volume of solvent with particulates. A typical solvent used in dismembrating is methyl ethyl ketone (MEK). The solvent is placed in a suitable container, and filler, such as EC 600JD Ketjen Black (which is a carbon filler product), is mixed with the solvent in a 20:1 solvent-to-filler ratio.

It is important in producing a loaded syntactic foam core material in accordance with the invention that the electromagnetic filler and solvent be mixed separately, because the resin typically has a viscosity that is too high to allow disentanglement or deagglomeration of the electromagnetic filler particles if the particles are directly mixed into the resin. It should also be noted that the weight of solvent that is required for separate mixing with the filler material is approximate, and is based upon fillers having densities comparable to carbon and solvents having specific gravity less than about 1.0, and more preferably about equal to that of MEK. Thus, with high density filler, it may be possible to use less solvent, and with high density solvents, it may be necessary to use more solvent. Nevertheless, a 20:1 weight ratio of solvent to electromagnetic filler should be a suitable starting point, even for materials other than MEK and carbon.

After mixing in step 106, the mixture of solvent and electromagnetic filler is then ultrasonically dismembrated in step 108. The dismembrating deagglomerates and separates the particles, and may produce interactions between the particles (at least with carbon particles). Typically, this process takes about 90 seconds. The process can be observed to be "finished" (at least when carbon-based fillers are used) when the filler-solvent mixture takes on a "gelatinous" look and a texture similar to a wet, gelatinous spackling paste, and requires a spatula to remove portions remaining in the mixing container after being poured out. It has been observed that the viscosity of the mixture increase fairly rapidly and then plateaus off, so the recommended 90 seconds for dismembrating the particles is actually a representative time selected from a wide range of acceptable times. If the process were to proceed for many minutes, however (possibly more than 5 or 6 minutes), the electromagnetic media particles may begin to reagglomerate and separate from the solvent.

Without desiring to be limited to any particular theory concerning the physical processes of dismembrating, it is believed that this process produces chains of between 7–10 particles that interlock and cross over each other to form a network, which enhances the electrical performance of the loaded syntactic foam produced according to this process. However, this theory is based on electrical tests with carbon-based electromagnetic fillers. Non-carbon fillers are also believed to interact between particles, but the interactions may be physically somewhat different.

When EC 600JD Ketjen Black is used as the filler, and MEK as the solvent, the solvent provides an adequate medium to break down the particulate carbon agglomerations to fine sub-micron particles which are believed to more freely and form particle chains which are believed to determine the dielectric properties of the material via chain link interactions when the ultrasonic vibrations of the dismembration tank are tuned to a particular frequency. For the specified filler and solvent, this tuned frequency is approximately 20 kHz. This frequency is believed to be high enough to disentangle the particulate carbon to form a web-like structure, but is low enough to prevent the carbon chains from separating. It is important to note that this particular filler is provided from the vendor in a granular form and it has been found that grinding the media and sieving it through a 100 mesh screen facilitates processing.

It should be noted that dismembrating step 108 is not required if the viscosity of the resin-solvent system produced in step 102 is less than about 1,000 cps. This value of viscosity, however, is merely a rule-of-thumb, and should not be taken as a precise limit.

Continuing under the presumption that electromagnetic filler is to be included, the material resulting from step 108 (or step 106, if dismembrating step 108 is omitted) is added to the resin-solvent system resulting from step 102 and mixed in step 110, followed by a (required) ultrasonic dismembrating step 112.

The resulting mixture from either step 102 (if no electromagnetic filler is included) or step 112 (if electromagnetic filler is included) is then thoroughly mixed, in step 114, with between 35 and 43, or preferably between 39 and 42, or more preferably, about 41 parts by total solids weight microspheres, and optionally, between 0 and 12, or preferably between 1 and 5, or more preferably about 3 parts by total solids weight of chopped fiberglass and/or any other filler to be added, such as dielectrics, flame retardants, etc. The microspheres and other optional ingredients (if any) in this step are slowly added to the (loaded or unloaded) resin-and-solvent mixture and blended to assure that no agglomeration occurs. In the preferred embodiment, the microspheres and fiberglass are added in stages and thoroughly blended into the mixture before more solid ingredients are added. The blending is performed at low speeds to avoid breakage of the microspheres. For a 3,000 gm (approximately five gallon) batch blended in a planetary mixer, ten minutes of mixing at low speed during each ingredient addition stage has been found to achieve substantially uniform dispersion of the ingredients and eliminate agglomerates without causing excessive microsphere breakage. The mixing may be performed as either a batch or continuous process, but should not be done to excess. Excess mixing is indicated if small spherical balls of coagulated material 0.125 to 0.25 inch in diameter are formed, and such mixtures should be rejected.

Step 116, in which slurry of step 116 is mixed under vacuum, may be performed to reduce the amount of solvent in the mixture so that static solvent removal (step 120 below) requires less time and is not required if an unloaded syntactic foam is being produced. If a loaded syntactic foam is being produced, step 116 should be performed if the amount of solvent in the mixture is greater than about 12 parts by total solids weight to reduce the total solvent to about 12 parts by weight so that the amount of time needed for static solvent removal in step 120 is reduced.

The resulting syntactic mixture at 118 is a syntactic with up to 25 parts by total solids weight of solvent, but preferably no more than 12 parts by total solids weight of solvent.

The next manufacturing step 120 is required only if the amount of solvent remaining in the product is greater than 7 to 10 parts by weight, which may be the case if a loaded syntactic foam is being produced. In this step, solvent is removed from the syntactic material so that the resulting material has between 7 to 10 parts by total solids weight of solvent. The resulting material may optionally be stored in a freezer for an extended period of time in step 122 if it is not to be used immediately. When it is used (whether immediately or after having been stored), it may be cast for B-stage sheet 124 and cured 126 to create a syntactic that may have a complex shape; or it may be packed into a mold 128 and cured 130 to make billets that may be machined or shaped 132 to a syntactic foam product; or it may be cast to a near net shape component in a tool 134 and cured 136 to create a syntactic foam product. If the mixture is cast into a mold, the mold should be treated with a suitable releasing agent or release film such as a FREEKOTE 700, 33 NC or 815 NC mold release agent. (FREEKOTE is a U.S. federally registered trademark of The Dexter Corp.) A porous release fabric such as CHR-3TLL (available from Furon, CHR Division, New Haven, Conn.) may be used to allow solvent to be released during cure. It should be noted that the syntactic material shrinks about 0.1% linear ft. (typically), and that poor release application can result in shrinkage cracks during cure.

Although casting for a B-stage sheet is shown in only box 124 in FIG. 4, this step preferably comprises multiple steps, as follows. The first of these steps is to measure out, either by weight or by volume a predetermined amount of material from the previous step, corresponding to a known volume of the desired B-stage product. Usually, the desired product is a sheet that is wrapped on a complex-shaped tool, but it could take other forms, such as a compound curved surface or a flat surface, and need not necessarily be limited to sheets.

The second step is to tamp or roll the material into a sheet having the desired dimensions, which can be accomplished in a manner similar to that of making a pie crust. Usually a dam is used to restrict the size and shape of the resulting sheet.

The third step is to apply standard vacuum bagging techniques for processing composite materials, such as described in "Handbook of Composites," edited by George Lubin, published by Van Nostrand Reinhold Company, New York, 1982. After this step, between 3 and 10 percent of solvent by total weight of solids should remain; i.e., between zero and somewhat more than half of the solvent should be removed.

The fourth step is to place the material resulting from the third step into an autoclave, and heating the material to a predetermined temperature for a predetermined amount of time, both of which depend upon the resin that is used in the material. The limitations are that the resin must still be within the thermoplastic range when the autoclaving is done; i.e., the crosslink density must be low. The point to which the resin should be advanced (i.e., "partially cured") may be determined by trial and error, or more preferably from resin viscosity curves that are obtained from the resin manufacturer. To use these curves, one looks for a point at which the viscosity reaches a minimum as a function of both time and temperature, and then "backs off" a few degrees (e.g., 10° to 20° F. less than the temperature specified for this minimum viscosity), or a few minutes (e.g., 10 to 15 minutes), or some combination thereof by varying the time and temperature between these "backed off" values and the point of minimum viscosity, so that this point is approached but not reached during this step. It has been found by experiment to be preferable not to vary the autoclaving time, but rather to vary only the temperature to reach the desired crosslink density for manufacturing purposes, primarily because of the relative ease of doing so and the greater degree of controllability that can usually be obtained.

The fifth step is to remove the material from the heat source and let it sit at room temperature for about 15 minutes, if it is a sheet no greater than ½ thick. (Greater thicknesses require correspondingly greater times.) It has been discovered that it is preferable not to use the material immediately, but rather to allow it to "age" for about 12 hours at room temperature, or more preferably for at least 12 hours in a freezer (e.g., at −20° F.), because the sheets have otherwise been found to crack occasionally when they are bent over a small radius (e.g., about four times the thickness of the sheet). Aging the material as described has, surprisingly, enhanced its conformability in such instances by reducing or eliminating its tendency to crack under such circumstances. If the material is to be used the next day, it is sufficient to age it at room temperature. However, "freezing" the material at −20° F. will allow it to be stored for an extended period of time before use. Storage of frozen B-stage material for several weeks has been found routinely possible, and it is believed that storage for up to a year or even longer is also possible, but attention should be paid to the expiration date given by the manufacturer of the resin used in such material. When the material is frozen, it should be allowed to return to room temperature prior to its use, although it may not be necessary to warm some silicone-resin based syntactic B-stage material to room temperature before use.

The sixth, and final, step encompassed in box 124 is to apply the material to the mold.

Returning to FIG. 4, final curing as in steps 126, 132, or 136 takes place by extracting the solvents under vacuum, heat, pressure, or some combination thereof. Depending upon the particular resin and solvent system used, the molded product may be cured fairly quickly by evaporation at room temperature. If the resin and solvent system will not "self cure" at room temperature, the mold may be placed in a vacuum bag and the bag may be de-pressurized to facilitate the solvent removal. In addition, the bag and material-filled mold may be placed in an autoclave so that a series of temperatures and pressures as desired can be applied to further cure the material. Once the material is sufficiently cured, the mold may be removed from the autoclave and vacuum bag, and the material may be removed from the mold. The cured material may then be machined and shaped using standard techniques which are well known in the art to produce a part having final component dimensions.

If the material is to be stored as a B staged material, the material may be placed in a vacuum bag which is then sealed before a vacuum pressure of at least 25 in Hg and as much as 29.9 in Hg is pulled for a length of time sufficient to remove greater than one half (approximately 51 percent) of the solvent. This is performed using vacuum and heat to partially advance the resin thereby yielding a highly conformable, pliable sheet. Obviously, the larger the amount of material, the longer the period of time the vacuum must be maintained before a sufficient amount of the solvent is removed. During vacuum de-airing, the materials should preferably be "fluffed up" periodically to expose new solvent containing materials to the vacuum and to avoid the formation of a "crust."

If the material is to be stored in the partially cured state rather than immediately used, the material is simply placed in a hermetically sealed container after being mixed. No vacuum, heat or pressure should be applied, although it is desirable to remove the excess air from the container to prevent evaporation of the solvent. Further, although refrigeration may not be necessary when the product is intended for only short term storage, refrigeration is preferred when the storage is intended for longer durations, and the material should preferably be stored in a freezer at a temperature of no greater than about 0° F. within 6 hours after mixing. When properly sealed and cold-stored, the material has been held for periods greater than five years without any noticeable degradation or changes in properties for certain resins. However, the storage time is a function of the reactivity of the resin employed. Nonetheless, if the material is not properly stored as described above, it will become "crusty" and cannot be molded or shaped.

The B staged material is sufficiently pliable to permit bends having radii as sharp as four times the material thickness. This pliable character of the partially cured material has been found to be particularly advantageous in making complex shapes. Further, because various adjuvants may be added to the material, a laminate structure of sheets having differing qualities may be formed from the partially cured material before "co-curing" the laminate to form a finished part. For example, sheets of B staged material having gradually increasing dielectric properties may be laid up with a layer of adhesive film between each sheet of B staged material. This laminated structure may then be cured to bond the adhesive layers to the sheets of B staged material and extract the remaining solvent from the material. The resulting structure is a light weight part that has tailored electromagnetic properties through its thickness. Further, because of the pliable nature of the B staged material, the resulting dielectrically tailored structure may take a complex geometric shape.

Figure 3B:
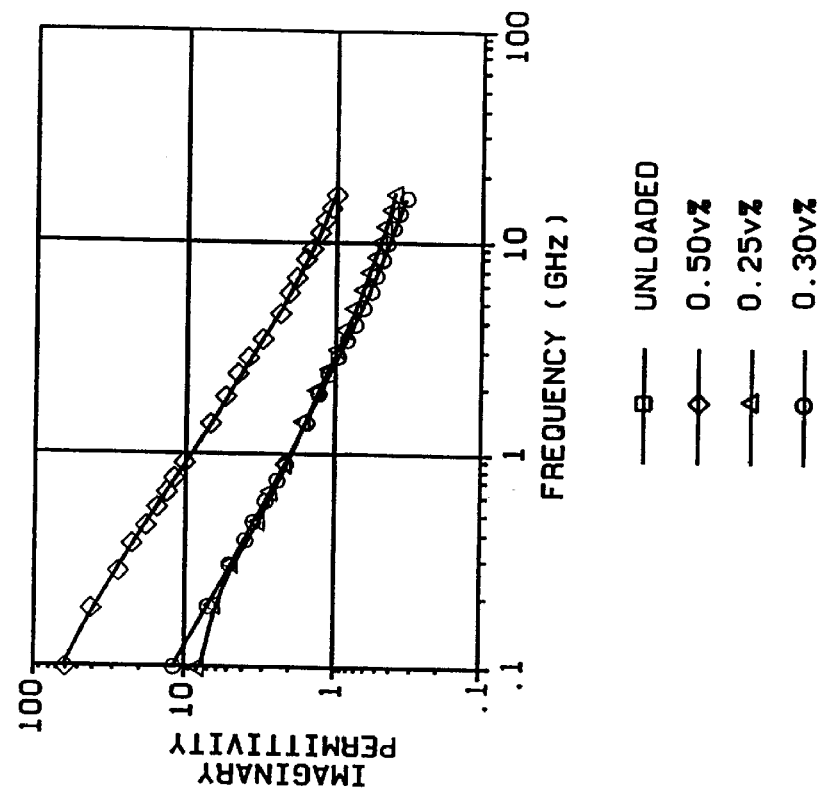
FIGS. 3A and 3B are, respectively, charts of the real and imaginary parts of permittivity of a loaded moderate temperature resin system material as a function of electrical frequency.
Figure 3A:
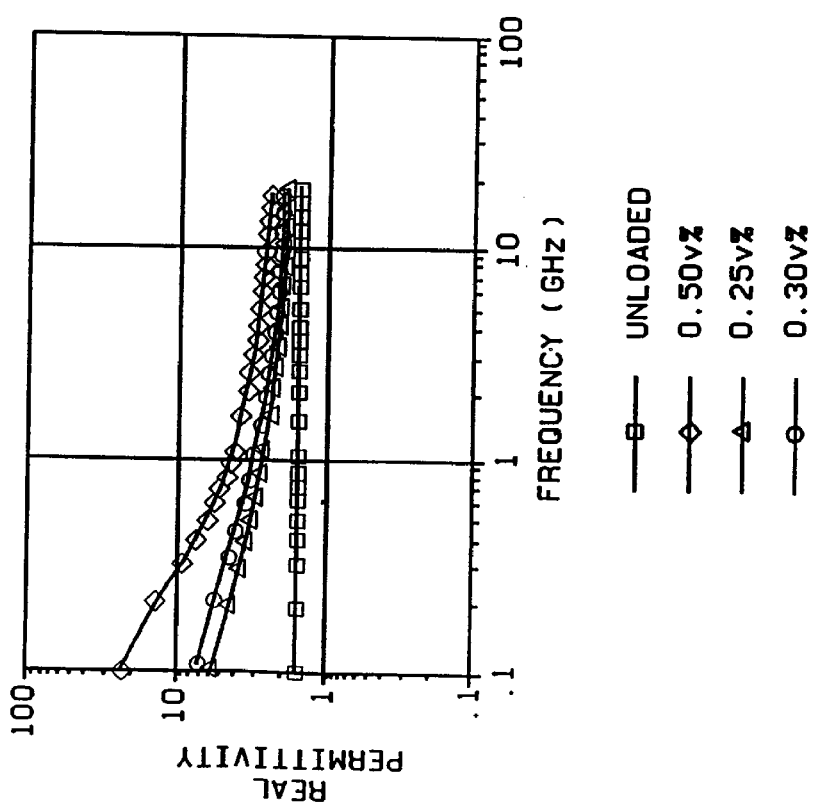

When syntactic foam-core based loaded with electromagnetic media is cured, the glass fibers and electromagnetic media set up tiny dipoles in the material which create spiking at various electrical frequencies which the designer may choose. By varying the amount of electromagnetic media added, the intensity of the spike will change. The resulting real and imaginary permittivities at various volume fractions of carbon filler as a function of frequency for a moderate temperature epoxy resin system are shown in FIGS. 3A and 3B, FIG. 3A showing the real part of the permittivity and FIG. 3B showing the imaginary part.

Figure 2:
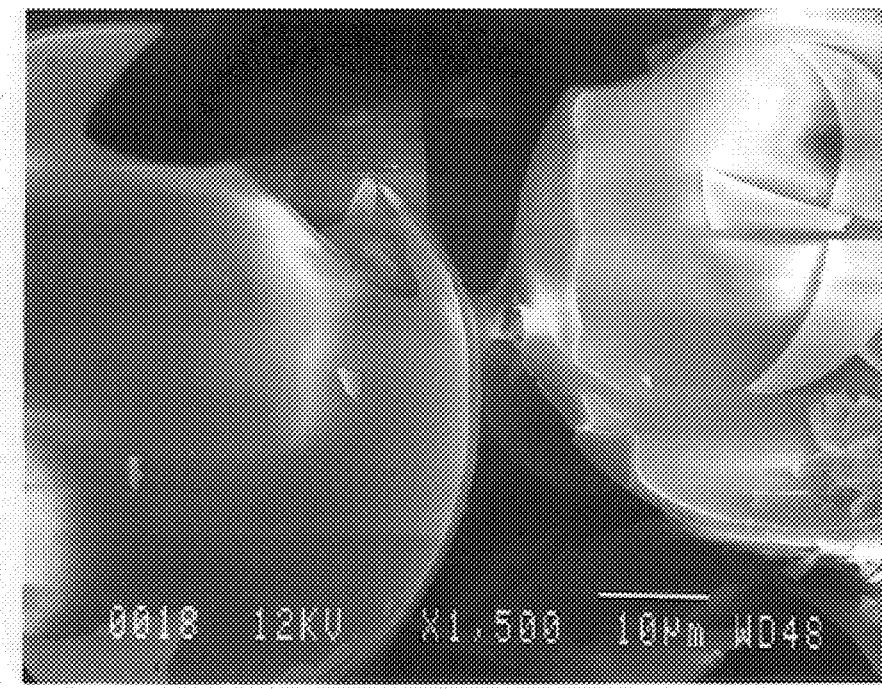
FIG. 2 is a photomicrograph taken a 1500 times magnification showing a detail of the structure of the syntactic foam-core material.

The syntactic foam-core material has ultra-low weight (below 0.35 gm/cc and even as low as 0.30 gm/cc and lower) due to the intersticial voids as shown in FIGS. 1 and 2. These voids are approximately 30 to 50 microns across. The solvent, prior to its removal from the foam core allows the microspheres to achieve maximum packing densities. Hence, as the photomicrographs of FIGS. 1 and 2 show, the syntactic material produced by the method of this invention is a network of resin coated microspheres that are tightly packed and spaced by controlled yet random voids to achieve a very low material density with isotropic mechanical as well as electrical properties, i.e., a structural bulk absorber.

It is believed that the inventive methods produce a maximum total volume of controlled random voids (i.e., at least 20% and more usually about 23 to 25% and typically about 25% by volume) by including, in the mixture, such large quantities of solvents as have heretofore not been used in prior art processes. The large volume of voids, and the randomness of their distribution within the material produce a surprisingly light composite material with favorable dielectric properties. While it is possible to introduce some quantity of voids in other syntactic materials by vigorously in a blender, the volume of voids that can be achieved by vigorous blending is limited because the blending needed to approach the volume of voids in the present invention would be so vigorous as to break a significant fraction of the microspheres, which itself would cause the density of the resulting syntactic to rise.

Figure 5A:
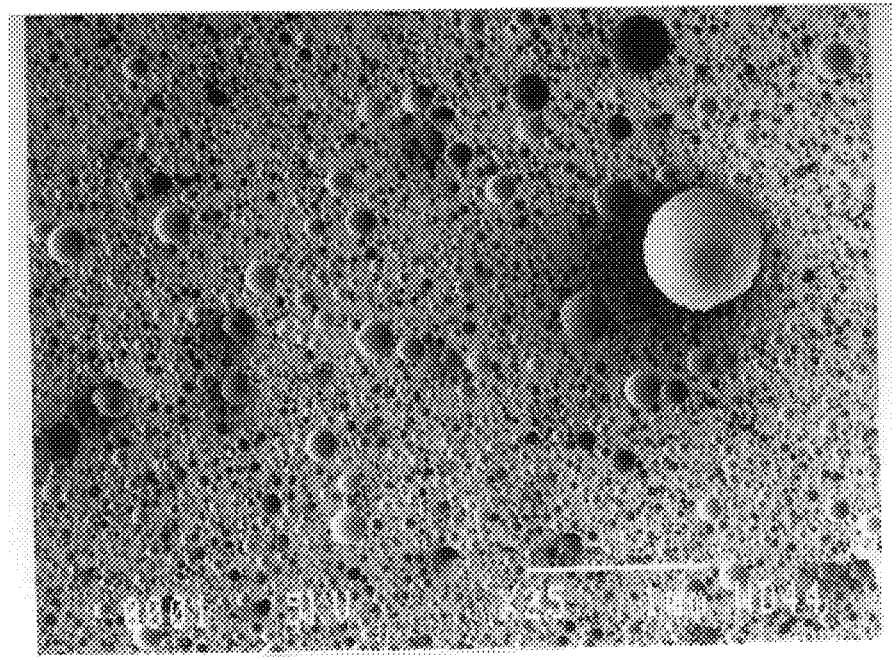
FIGS. 5A, 5B, and 5C are, respectively, photomicrographs taken at 25, 100, and 500 times magnification showing the detail of the structure of a prior art syntactic foam-core material, showing the nearly complete filling of the space between microspheres with resin material.
Figure 5B:
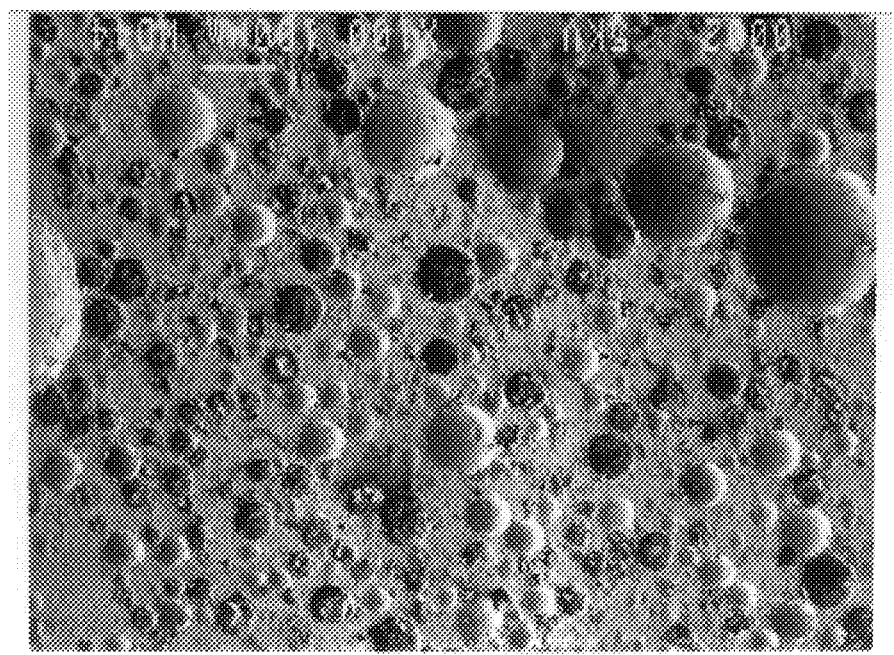
Figure 5C:
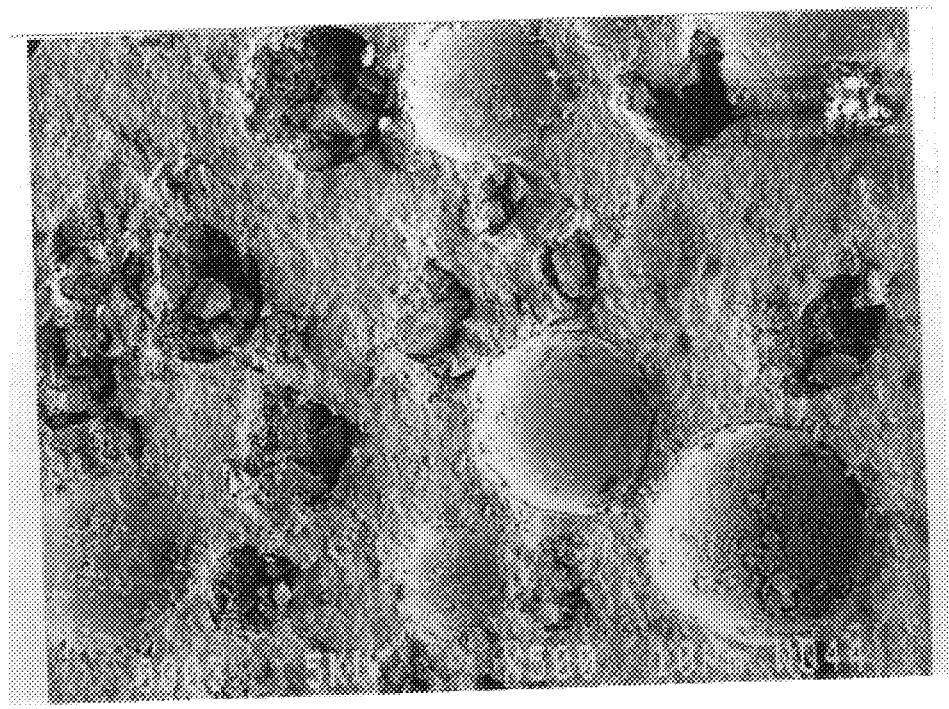
Figure 6A:
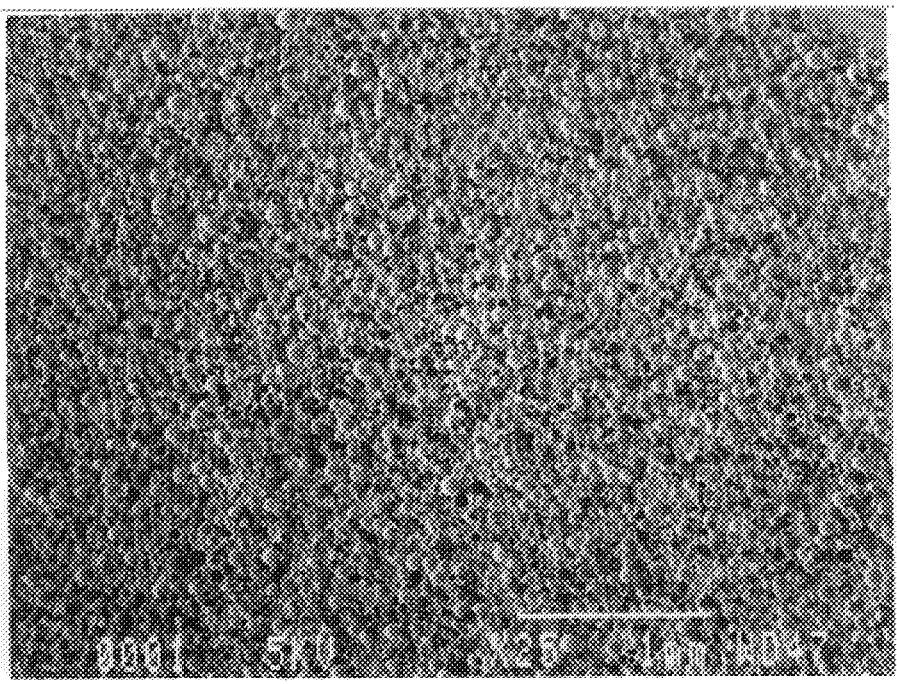
FIGS. 6A, 6B, and 6C are, respectively, photomicrographs taken at 25, 100, and 500 times magnification of a syntactic foam-core material in accordance with the invention, which, in contrast to FIGS. 5A, 5B, and 5C, show numerous voids in the resin between microspheres.
Figure 6B:
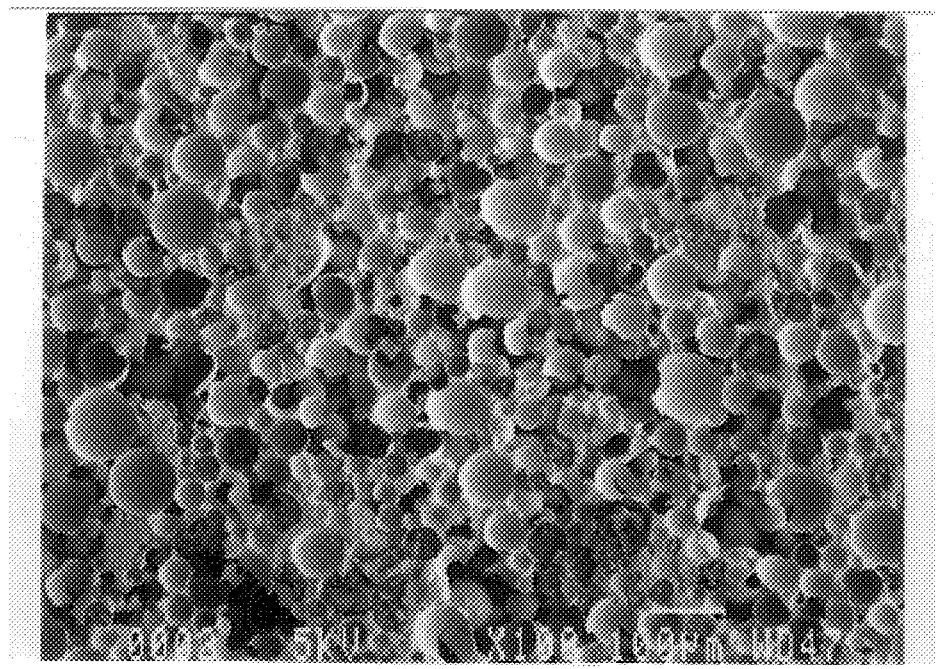
Figure 6C:
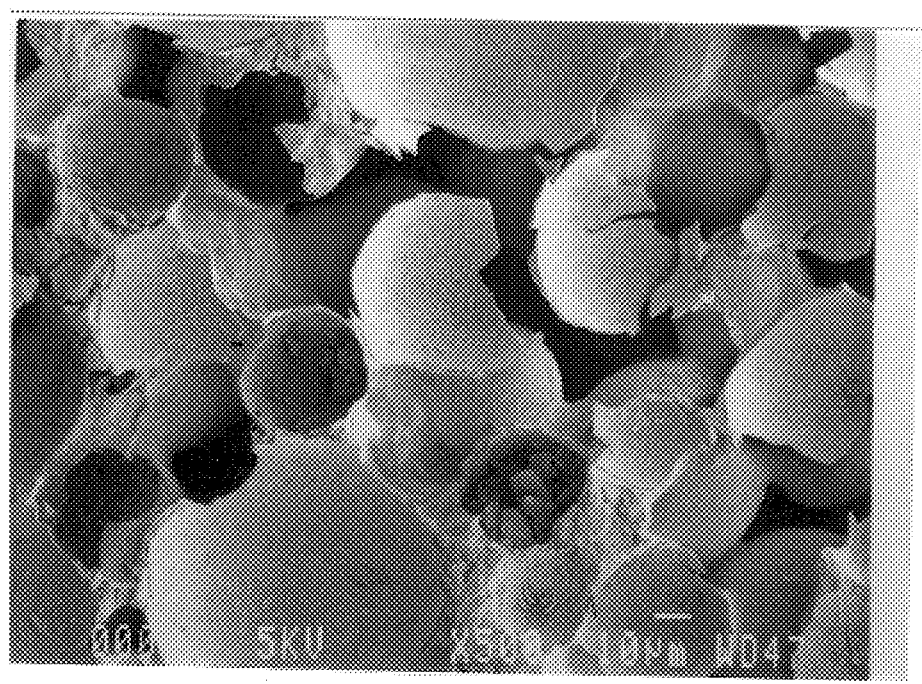

A more detailed comparison of the interstitial voids present in a syntactic foam-core material in accordance with the invention and the prior art may be observed by comparison of each of FIGS. 5A, 5B, and 5C, with FIGS. 6A, 6B, and 6C, respectively. FIGS. 5A, 5B, and 5C show a prior art foam-core material believed to be made in accordance with, or at least be substantially similar, to those of Oldham and DuPont in the references mentioned above. This material has been sliced, and FIGS. 5A, 5B, and 5C show the exposed surface magnified 25, 100, and 500 times, as seen through an electron microscope. Corresponding FIGS. 6A, 6B, and 6C showing a foam-core material in accordance with the invention have been magnified the same amount. Few voids can be seen in the exposed surface of the prior art foam-core material in FIGS. 5A, 5B, and 5C, and in general, all of the space between the microspheres is filled with solid resin. Some of the few voids that are visible appear to have been left only as a result of microspheres being broken or removed from the exposed surface as a result of slicing through the material.

On the other hand, FIGS. 6A, 6B, and 6C, showing a foam-core material in accordance with the present invention, clearly shows the presence of many microscopic interstitial voids other than those obviously caused by the breaking and physical dislodging of microspheres from slicing the material. By actual count from photomicrographs of cut surfaces, it is estimated that a typical region of 1 square millimeter of the inventive material includes about 75 voids of varying shapes and sizes, but roughly characterized by dimensions of about 50 microns across in the plane of the cut surface. (It should be noted that this count includes only voids that are actually caused by the absence of resin between spheres, and not those created by slicing through the spheres.) These voids appear to be limited in size primarily by the sizes of the spaces between microspheres that have attained a maximum packing density, or at least a very good approximation thereof. The total microscopic void content of the syntactic foam in accordance with the invention is typically about 25%.

Figure 7A:
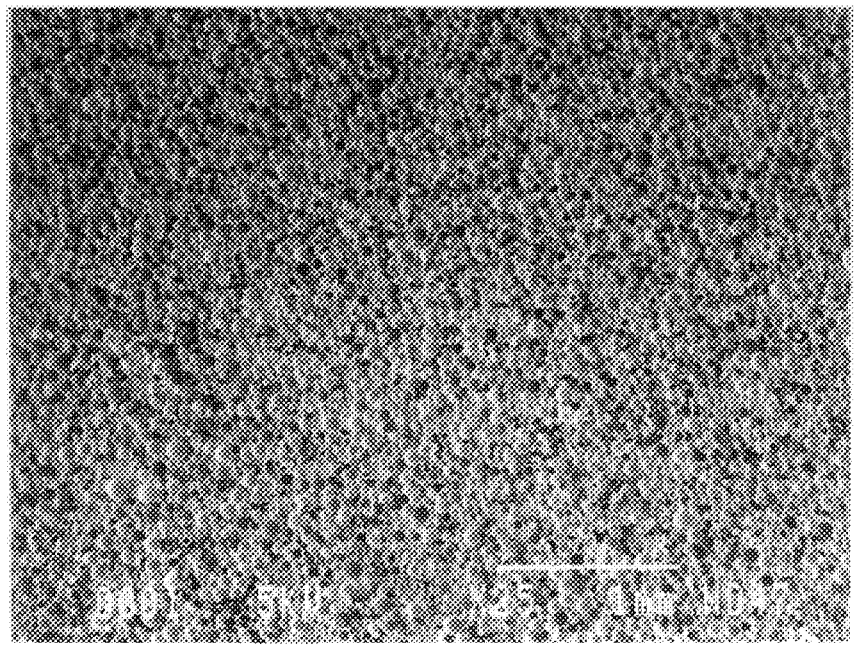
FIGS. 7A, 7B, and 7C are photomicrographs of another cut region of a syntactic foam-core material in accordance with the invention, at magnifications corresponding to those of FIGS. 6A, 6B, and 6C, respectively.
Figure 7B:
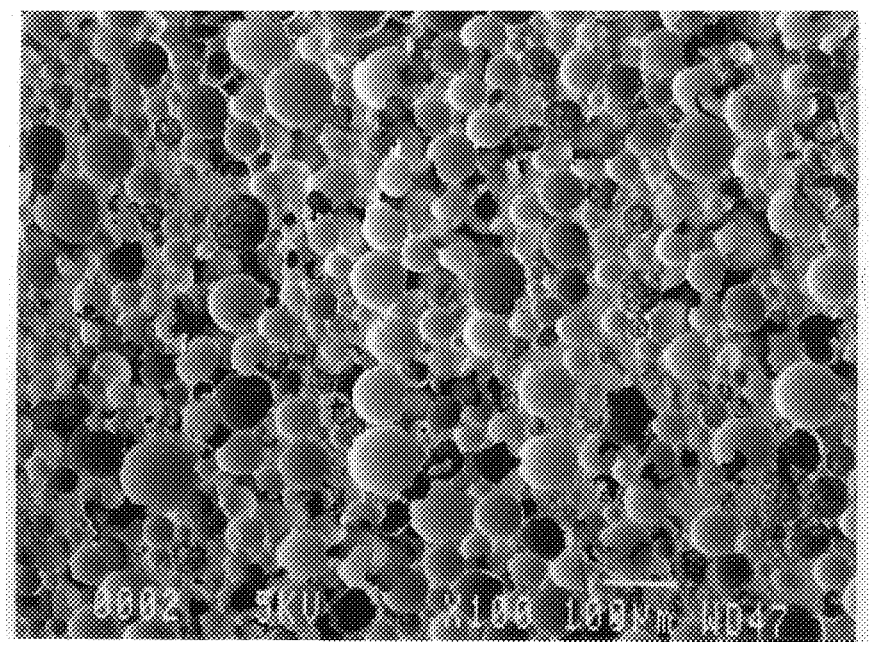
Figure 7C:
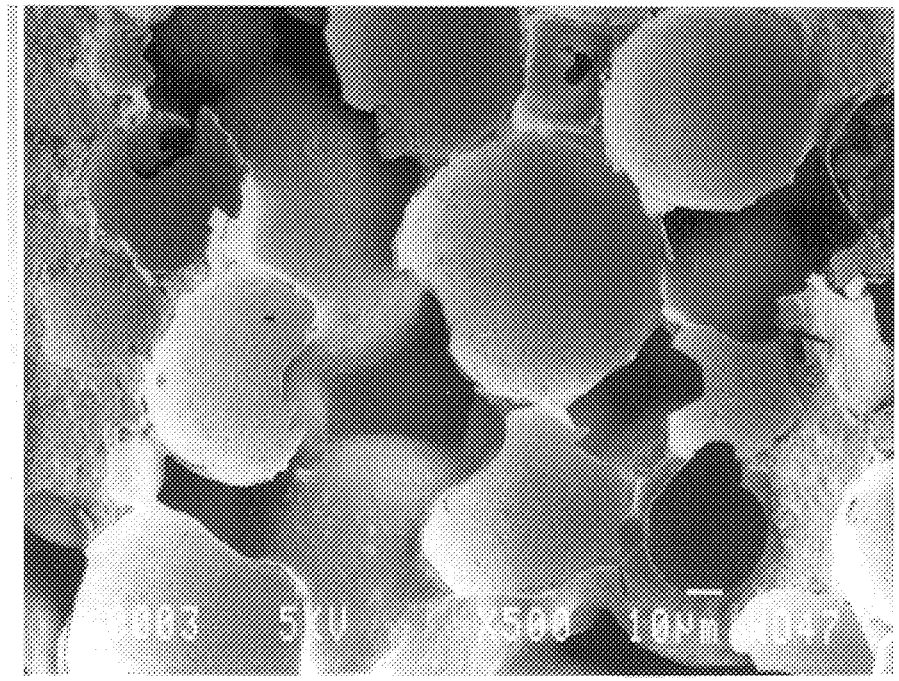

FIGS. 7A, 7B, and 7C are photomicrographs of a different cut region of a syntactic foam-core material in accordance with the invention, having the same magnifications as FIGS. 6A, 6B, and 6C, respectively, and showing a similar random distribution of microscopic voids.

While it has generally been accepted that syntactic foam materials are generally no more than 60 v/o microspheres, syntactic in accordance with this invention is 41 w/o, which translates to approximately 70 v/o. By diluting the binding resin with 7 to 10 w/o (by total solids weight) of a compatible solvent, the syntactic foam mixture can be "supersaturated" with a plethora of microspheres, thus effectively achieving maximum packing densities, or at least excellent approximations thereof. This means that, when solvent is removed during cure, the material does not compress any further (or at least by such small amounts as to be of little or no practical significance) under either vacuum or autoclave pressure, primarily because the resin is so highly loaded with spheres. During cure, the resin viscosity drops, which enables the solvent, which has a low vapor pressure, to easily migrate through the resin and out of the syntactic core through breather cloth. The elimination of the solvent is the key to creating and controlling viscosity.

It is important to note that the distribution of microscopic voids in the syntactic must be random to achieve the advantages of the invention. For example, if the voids were to exhibit some preferential alignment direction, structural integrity would be lost. Furthermore, when an electric or magnetic filler is used, the randomness of the voids is necessary to filler dispersion, because any directionality of the voids would negate the intended bulk electrical or magnetic properties of the foam. It is further noted that, by "microscopic voids," it is meant that the voids are in the range of approximately 20–80 microns, being limited in size primarily by the sizes of the spaces between microspheres, as noted above. Some voids may be larger or smaller, but the voids are of microscopic size—i.e., aside from holes that may have been formed by other processes such as by molding or machining the syntactic foam, the voids created by formulating and curing the syntactic foam in accordance with the invention are not so much larger than the microspheres themselves that the cured syntactic foam appears essentially solid to the naked eye.

As a further advantage of the present invention, the radar absorption qualities of the material may be tailored to the requirements of the particular application. Depending upon the resin system used, the material has a range of temperature capabilities, strength capabilities, and costs. Although by no means exhaustive, several examples of different formulations of the syntactic foam-core materials and methods of making these materials of the present invention are provided below. (FIGS. 6A, 6B, 6C, 7A, 7B, and 7C, in fact, are photomicrographs of syntactic foam-core material in accordance with the invention containing carbon particles. However, the carbon particles are too small to be seen at this magnification, and would not in any event be distinguishable in a photomicrograph, because of the standard surface coating applied to the material to prepare it for electron microscopy.)

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples all percentages are given on a weight basis unless otherwise indicated.

EXAMPLE 1

Unloaded Low Temperature Epoxy System

A low temperature epoxy resin was prepared from EPON 828 resin and a 3-diethylaminopropyl-amine (DEAPA) catalyst. EPON® is a U.S. federally registered trademark of the Shell Chemical Corporation. The epoxy was mixed in a ratio of about 95 percent EPON 828 resin and about 5 percent DEAPA catalyst. Fifty-six parts of this epoxy was mixed with 8 parts by weight of total solids content of methyl ethyl ketone (MEK) and then 41 parts of microspheres and 3 parts of fiberglass were slowly added to the mixture. The microspheres used were SCOTCHLITE H20/1000 glass microspheres. SCOTCHLITE is a U.S. federally registered trademark of 3M Company. The fiberglass was No. 497 DB ⅛ inch milled D-glass fiber manufactured by Owens Corning Fiberglass.

Several different finished material thicknesses were made. Depending upon the material thickness, the curing procedure was varied to assure that a sufficient amount of solvent was removed throughout the entire thickness of material. For materials up to two inches thick, the material was heated gradually (at a rate of about ½° F. per minute) to about 160° F. and held under full vacuum for about four hours. For material thicknesses from two inches to six inches, the material was heated gradually to about 120° F. and held for about two hours, then heated to about 140° F. and held for about two hours, and then heated to about 160° F. for up to about four hours. For material thicknesses greater than six inches, the material was heated to about 105° F. for up to about four hours, then heated to about 120° F. for up to about two hours, then heated to about 140° F. for about two hours, and then heated to about 160° F. for up to about four hours.

EXAMPLE 2

Unloaded Moderate Temperature Epoxy System

A moderate temperature epoxy resin system was made using EPON 9420 moderate temperature epoxy resin and EPON 9470 catalyst. The epoxy was mixed in a ratio of about 80.3 percent resin to about 19.7 percent catalyst or essentially in a ratio of 4:1. As with Example 1, fifty-six parts of epoxy was then mixed with 8 parts by weight of total solids content of methyl ethyl ketone (MEK) before 41 parts of SCOTCHLITE H20/1000 glass microspheres and 3 p parts of No. 497 DB fiberglass were slowly added to the mixture.

To fully cure the moderate temperature epoxy system, the thoroughly mixed material was maintained under a full vacuum for approximately four hours prior to being heating gradually to approximately 175° F. under continued full vacuum pressure. The temperature and pressure were maintained at these levels for approximately one hour until the heat was increased to about 250° F. Once the 250° F. was obtained, a pressure of about 15 psi was exerted on the exterior of the vacuum bag and this condition was held for about one hour. Next, the temperature was increased to about 300° F. and held for about one hour, then to about 350° F. and held for about four hours. The material was then slowly cooled to room temperature at a rate of no greater than about 1° F. per minute. Once room temperature was achieved, the pressure and vacuum were released and the finished molded product was removed. The finished product had a higher temperature capability than the low temperature epoxy resin system but cost slightly more to produce.

EXAMPLE 3

Unloaded Cyanate Ester Resin System

To produce this material, Ciba-Geigy M-20 cyanate ester resin was combined with a cobatic acetylacetonate curing agent and dinonyl-phenol reactive diluent. These compounds were combined in a ratio of approximately 93.0 percent of cyanate ester high viscosity resin which is diluted to about 66 percent solids, about 6.0 percent dinonyl-phenol reactive diluent and about 0.16 to about 0.20 percent cobatic acetylacentonate curing agent. The catalyst formed from the supersaturated dinonyl-phenol solution was made at an elevated temperature of between about 80° and about 160° F. prior to adding it to the solvent. The solvent was made from MEK and naphtha in a ratio of about 8:1 MEK to naphtha. The cyanate ester resin solution was added to this catalyst-solvent solution and the mixture was thoroughly blended.

The mixture was cured much as the moderate temperature epoxy resin system except that a pressure of about 50 psi was exerted on the vacuum bag when the full vacuum was pulled in the bag and the mixture is gradually heated to about 175° F. and held for approximately one hour. Then, the material was gradually heated directly from about 175° F. to about 350° F. and held for approximately four hours. The material was cooled at a rate of no greater than about 1° F. per minute until room temperature was achieved. The fully cured cyanate ester composite material had a higher temperature capability than the moderate temperature epoxy resin system but at a higher material cost.

EXAMPLE 4

Unloaded Polyimide Resin System

No curing agent was required for the polyimide resin system as the material automatically cured when heat and pressure were applied. AFR-700 polyimide resin produced by Hycomp AMSPEC Chemical Corporation was used to produce this system. Various viscosity polyimide resins having viscosities within the range of about 800 to about 2,000 cP were made. The polyimides were transformed to the various viscosities by dilution with methanol to achieve the desired viscosity range.

The solvent used with the polyimide resin system was about a 1:1 ratio of methanol and methyl-2-pyrrolidinone. As before, the resin and microspheres were mixed in a weight ratio of about 56:41. The fully admixed material was cured by holding it under a full vacuum for four hours minimum and gradually heating the mixture to about 420° F. and holding that temperature for about three hours. Then, the material was heated to approximately 480° F. and held for about one hour. At the end of the hour, a pressure of about 55 psi was applied and the material was gradually heated to about 700° F. and held for a minimum of four hours. The material was cooled slowly (at a rate of less than about 1° F. per minute) to room temperature. The finished parts made from the polyimide were found to have the highest temperature capability of any of the resin systems previously described but also had the highest cost.

EXAMPLES 5–8

Loaded Syntactic Foam-Core Systems

Loaded syntactic foam-core materials were made using each the systems previously described as Examples 1–4. For a 3,000 grams batch of material with a carbon loading of 0.25 volume percentage, 45 grams of particulate carbon were added to 900 grams of MEK. This slurry was ultrasonically dismembrated for a minimum of 90 seconds. The dismembrated slurry was then introduced into the respective resin-solvent mixture described above and blended to form a homogeneous system. The processing then proceeded as in the respective unloaded version described above until the mixture was completed. However, once the mixing was complete, the mixer was sealed, restarted and a vacuum was drawn on the contents of the mixer to evacuate the mixer to above 25 in Hg to remove the solvent from the mixture. After about ten minutes of mixing under vacuum, the mixer was stopped, the vacuum was released and the material was removed. The material was weighed to assure that no more than ten percent solvent remained. If greater than ten percent solvent was present, the material was statically de-aired in a vacuum chamber until the target mass was achieved. For the cyanate ester version described above, a 9:1 blend of MEK and naphtha was used as the dismembrating solvent. For the polyimide version described above, a 3:1 blend of methanol and n-methylpyrollidino (NMP) was used as the dismembrating solvent.

EXAMPLE 9

Solvent Extraction During Processing

A moderate temperature epoxy system was prepared from EPON 9420/9470 resin with a ratio of 80:20. Fifty-six parts (1683 grams) of this resin was mixed with 8 parts by weight total solids content of methyl ethyl ketone (MEK) (240 grams). This solution was mixed for approximately 10 minutes. To this mixture 45 grams of a particulate carbon, EC 600JD, Ketjenblack, a product of Akzo Chemical Corporation, and an additional 900 grams of MEK were added. This resin/carbon/excess solvent solution was then ultrasonically dismembrated for 90 seconds. Then 41 parts (1230 grams) microspheres and 3 parts (90 grams) chopped fiberglass were slowly added to the mixture. The microspheres used were FTD 200 "MICROBALLOONS®" from Grace Co. and the fiberglass was No. 497DB ⅛ inch milled D-glass manufactured by Owens-Corning Fiberglass. According to The Grace Co. FTD-200 Technical Bulletin, the microspheres used in this example are glass spheres typically comprising 93% $SiO_2$, 2% $Na_2O$, 3% $B_2O_3$, and 1% BaO and having a density of 0.20 g/cc, a softening point of 750° C., and a wall thickness of 1.00 μm. The spheres have a typical size distribution of 5.3% from 0–20 μm, 11.2% from 21–40 μm, 49.4% from 41–80 μm, and 34.1% over 80 μm. The Technical Bulletin indicates that, at 250 psi, 10% of the spheres collapse; at 500 psi, 27% of the spheres collapse, and at 1000 psi, 65% of the spheres collapse.

Once all the materials are combined they were mixed for about 10 minutes. The mixer lid was then raised and the vacuum seal was cleaned from any floating debris, i.e., carbon or glass dust. The mixer was then closed and mixing resumed. Vacuum was then introduced to the system. At this point there was approximately 900 grams of excess solvent in the material that needed to be removed. The slurry was mixed for approximately 20 minutes under vacuum, after which the mixer was stopped, the vacuum was removed, and the mixer was opened. The material was removed and stored in a suitable container. At this point the material had 600 grams of excess solvent.

It is not recommended to mix the material any longer than the above amount of time under vacuum because a phenomenon identified as "pilling" has been observed with longer mixing. "Pilling" is the development of small, resin-rich nodules of material. Without wishing to be bound by any particular theory, it appears that, as the material loses solvent during vacuum mixing, the shear forces in the material rise. If too much solvent is removed the material starts to ball up and form spheroidal shaped "pills" which if used in subsequent fabrication will alter strength as well as electromagnetic properties. Therefore, the material was removed and placed in a bell jar. The excess solvent was then statically removed from the syntactic mixture in the bell jar. Periodically during this removal the material was manually mixed so that new solvent removal surfaces were created to increase removal efficiency. Once the 600 grams of excess solvent were removed there was only be approximately 300 grams of solvent remaining in the syntactic paste, which is sufficient for processing and void creation during cure.

To fully cure the moderate temperature epoxy system, the material was cast into a mold and maintained under a full vacuum for approximately four hours prior to being heated gradually to 175° F. under continued full vacuum pressure. The temperature and vacuum pressure were maintained for 1 hour until the heat was increased to about 250° F. Once this temperature was obtained, an external pressure of about 15 psi was exerted on the bag and this condition was held for about one hour. Next the temperature was increased to 300° F. and held for 1 hour, then to about 350° F. and held for about 4 hours. The material was then slowly cooled to room temperature at a rate of no greater than about 1° F. per minute. Once room temperature was achieved, the pressure and vacuum were released and the finished molded syntactic part was removed.

EXAMPLE 10

Dismembrating After Mixing

A moderate temperature epoxy system was prepared from EPON 9420/9470 resin with a ratio of 80:20. Fifty-six parts (1683 grams) of this resin was mixed with 8 parts by weight total solids content of methyl ethyl ketone (MEK) (240 grams). This solution was mixed for approximately 10 minutes. To this mixture 45 grams of a particulate carbon, EC 600JD, Ketjenblack, a product of Akzo Chemical Corporation, and an additional 900 grams of MEK were added. This resin/carbon/excess solvent solution was then ultrasonically dismembrated for 90 seconds. Then 41 parts (1230 grams) microspheres and 3 parts (90 grams) chopped fiberglass were slowly added to the mixture. The microspheres used were FTD 200 "MICROBALLOONS" from Grace Co. and the fiberglass was No. 497DB ⅛ inch milled D-glass manufactured by Owens-Corning Fiberglass. The material was then processed in accordance with the method described in previous examples to provide a viable material.

So that the moderate temperature epoxy system was fully cured, the material was cast into the desired shape mold and maintained under a full vacuum for approximately four hours prior to being heated gradually to 175° F. under continued full vacuum pressure. The temperature and vacuum pressure were maintained for 1 hour until the heat was increased to about 250° F. Once this temperature was obtained, an external pressure of about 15 psi was exerted on the bag and this condition was held for about one hour. Next the temperature was increased to 300° F. and held for 1 hour, then to about 350° F. and held for about 4 hours. The material was then slowly cooled to room temperature at a rate of no greater than about 1° F. per minute. Once room temperature was achieved, the pressure and vacuum were released and the finished molded syntactic part was removed.

EXAMPLE 11

Loaded B-Staged Material

A moderate temperature epoxy system was prepared from EPON 9420/9470 resin with a ratio of 80:20. Fifty-six parts (1683 grams) of this resin was mixed with 8 parts by weight total solids content of methyl ethyl ketone (MEK) (240 grams). This solution was mixed for approximately 10 minutes. In a separate container 45 grams of a particulate carbon, EC 600JD, Ketjenblack, a product of Akzo Chemical Corporation, was combined with 900 grams of MEK. This solution was ultrasonically dismembrated for a minimum of 90 seconds and than was combined with the resin/solvent mixture. The resulting new mixture was stirred for about 10 minutes. This resin/carbon/excess solvent solution was then ultrasonically dismembrated for 90 seconds. Then 41 parts (1230 grams) microspheres and 3 parts (90 grams) chopped fiberglass were slowly added to the mixture. The microballoons used were FTD 200 microballoons from Grace Co. and the fiberglass was No. 497DB 1/8 inch milled D-glass manufactured by Owens-Corning Fiberglass.

This mixture was then processed according to earlier examples up to the cure. In order to make a staged sheet for fabrication of a complex shaped part, a rectangular mold 24 inches by 48 inches by 0.20 inches was used. To the mold, 1210 grams of the syntactic foam material was removed from the storage bag and spread evenly into the mold. It was then tamped evenly and rolled with a 3 inch diameter pipe to the desired thickness with a sheet of release film separating the syntactic from the processing instruments. The sheet was then bagged using standard composite autoclaving materials and techniques. Once ready for processing, Shell Tech Bulletin SC:1011-90 was consulted. Page 3 of this bulletin provides viscosity versus time plots at various temperatures. For the B-staged material application, a temperature of less than 210° F. was judged to be desirable because viscosity quickly rises beyond this point, according to the bulletin. Empirical testing allowed the determination that a temperature of 190° F. was adequate. Hence the bagged sheet was placed into the autoclave, vacuum was drawn on the part (<25 in. Hg), and it was subsequently heated from room temperature to 190° F. in 30 minutes and held at that temperature for a period of time not greater than 2 hours. The part was then quickly removed, still under vacuum and placed on a metal table that was at room temperature (75° F.).

Material prepared in this way was found to be suitable for at least three modes of use: immediate use by wrapping the sheet into place on a tool; storage at room temperature under vacuum for 12 to 24 hours prior to wrapping on the tool; and storage in a freezer at approximately 20° F. in the absence of air for use at a later date. In the latter case, the material was allowed to thaw, and then was wrapped around the tooling mandrel.

EXAMPLE 12

An Unloaded B-Staged Material

A moderate temperature epoxy system was prepared from EPON 9420/9470 resin with a ratio of 80:20. Fifty-six parts (1683 grams) of this resin was mixed with 8 parts by weight total solids content of methyl ethyl ketone (MEK) (240 grams). This solution was mixed for approximately 10 minutes. Then 41 parts (1230 grams) microspheres and 3 parts (90 grams) chopped fiberglass are slowly added to the mixture. The microballoons used were FTD 200 microballoons from Grace Co. and the fiberglass was No. 497DB 1/8 inch milled D-glass manufactured by Owens-Corning Fiberglass.

This mixture was then processed according to earlier examples up to the cure. To make a staged sheet for fabrication of a complex shaped part, a rectangular mold 24 inches by 48 inches by 0.20 inches was used. A 1210 gram sample of the syntactic foam material was removed from the storage bag and spread evenly into the mold. The material was then tamped evenly and rolled with a 3-inch diameter pipe to the mold thickness with a sheet of release film separating the syntactic from the processing instruments. The sheet was then bagged using standard composite autoclaving materials and techniques. Once ready for processing, Shell Tech Bulletin SC:1011-90 was consulted. Page 3 provides viscosity versus time plots at various temperatures. For this application a temperature of less than 210° F. was determined to be desirable because viscosity quickly rises beyond this point. Empirically, a temperature of 190° F. was found to be adequate. Hence the bagged sheet was placed into the autoclave, vacuum was drawn on the part (<25 in. Hg), and it was subsequently heated from room temperature to 190° F. in 30 minutes and then held at that temperature for a period of time not greater than 2 hours. The part was then quickly removed, still under vacuum and placed on a metal table that was at room temperature (75° F.).

This material was found to be suitable for the same modes of use as the loaded B-staged material of Example 12.

EXAMPLE 13

Fabrication of A Billet of Material

A moderate temperature epoxy system was prepared from EPON 9420/9470 resin with a ratio of 80:20. Fifty-six parts (1683 grams) of this resin was mixed with 8 parts by weight total solids content of methyl ethyl ketone (MEK) (240 grams). This solution was mixed for approximately 10 minutes. In a separate container 45 grams of a particulate carbon, EC 600JD, Ketjenblack, a product of Akzo Chemical Corporation, was combined with 900 grams of MEK. This solution was ultrasonically dismembrated for 90 seconds. The dismembrated mixture was then combined with the resin/solvent mixture and this new mixture was stirred for about 10 minutes. This resin/carbon/excess solvent solution was then ultrasonically dismembrated for 90 seconds. Then 41 parts (1230 grams) microspheres and 3 parts (90 grams) chopped fiberglass were slowly added to the mixture. The microballoons used were FTD 200 microballoons from Grace Co. and the fiberglass was No. 497DB 1/8 inch milled D-glass manufactured by Owens-Corning Fiberglass. This mixture was then processed according to earlier examples.

A billet of syntactic foam was fabricated according to the following method. A 60 inches by 7 inches by 7 inches aluminum mold was prepared and properly released with Frekote 700, a mold release agent available from the Dexter Corporation. After preparation of the mold, approximately 15500 grams of material were packed into to mold in two 6000 gram increments followed by the remaining amount. After each increment, the material was tamped down to firmly pack the material into the mold. Once complete, the tool was closed and bagged using standard composite autoclave bagging techniques. The part was cured to steps defined in earlier examples. After cure the foam billet was removed from the mold and was found to be 59.75 inches by 7 inches by 7 inches. This syntactic foam billet was then machined to a triangular wedge that tapered from 3 inches to 6.5 inches at the base. The tip of the part had a razor sharp edge with a radius of less than 1/32 inch. This part was suitable for use as a fly-away mandrel for curing of composite skin material.

EXAMPLE 14

Casting the Foam to Shape

A moderate temperature epoxy system was prepared from EPON 9420/9470 resin with a ratio of 80:20. Fifty-six parts (1683 grams) of this resin was mixed with 8 parts by weight total solids content of methyl ethyl ketone (MEK) (240 grams). This solution was mixed for approximately 10 minutes. In a separate container 45 grams of a particulate carbon, EC 600JD, Ketjenblack, a product of Akzo Chemical Corporation, was combined with 900 grams of MEK. This solution was ultrasonically dismembrated for 90 seconds. The dismembrated mixture was then combined with the resin/solvent mixture and this new mixture was stirred for about 10 minutes. This resin/carbon/excess solvent solution was then ultrasonically dismembrated for 90 seconds. Then 41 parts (1230 grams) microspheres and 3 parts (90 grams) chopped fiberglass were slowly added to the mixture. The microballoons used were FTD 200 microballoons from Grace Co. and the fiberglass was No. 497DB ⅛ inch milled D-glass manufactured by Owens-Corning Fiberglass. This mixture was then processed according to earlier examples.

It was desired to cast a triangular wedge with dimensions of 6 inches height, a base of 4 inches, and running length of 48 inches to shape. An aluminum mold was prepared and properly released with Frekote 700, a mold release agent available from the Dexter Corporation. After preparation, approximately 3050 grams of material were used to fill the mold. Initially the mold was filled only ⅛ to ¼ inch with the material and tamped into to mold so that the material would pack well, to provide good tip definition. This filling of ⅛ to ¼ inch was repeated several times until the mold was filled to 1 inch, after which material was added and tamped in 500 gram increments. Once complete the tool was closed and bagged using standard composite autoclave bagging techniques. The part was cured using procedures defined in earlier examples. After cure, the net shape foam billet was removed from the mold and was found to be 48 inches in length with a 4 inches base and 6 inches height. The tip of the part had a razor sharp edge with a radius of less than $\frac{1}{32}$ inch. This part was determined to be suitable for use as a fly-away mandrel for curing of composite skin material.

EXAMPLE 15

Measurement of Physical Properties

Samples of syntactic foam material were prepared in accordance with the following Table I:

TABLE I

| Type | v/o Carbon | Resin A | Resin B | Curing Agent | Solvent | Carbon Filler | Micro-sphere | Glass Fibers |
|---|---|---|---|---|---|---|---|---|
| | | | | | Grams of Component | | | |
| I | | Epon 828 | N/A | DEAPA | MEK | EC 600JD | H20/ 1000 | 497 DB |
| | 0 | 1596 | | 84 | 200 | N/A | 1230 | 90 |
| | 0.25 | 1596 | | 84 | 915 | 45.7 | 1230 | 90 |
| | 0.30 | 1596 | | 84 | 1100 | 55.0 | 1230 | 90 |
| | 0.50 | 1596 | | 84 | 1800 | 90.0 | 1230 | 90 |
| | 0.70 | 1596 | | 84 | 1800 Note 7 | 131.4 | 1230 | 90 |
| II | | Epon 9420 | N/A | Epon 9470 | MEK | EC 600JD | H20/ 1000 | 497 DB |
| | 0 | 1350 | | 333 | 200 | N/A | 1230 | 90 |
| | 0.25 | 1350 | | 333 | 915 | 45.7 | 1230 | 90 |
| | 0.30 | 1350 | | 333 | 1100 | 55.0 | 1230 | 90 |
| | 0.50 | 1350 | | 333 | 1800 | 90.0 | 1230 | 90 |
| III Note 1 | | M-20 Note 2 | 75132 DNP-F | CO AC AC | Note 3 | EC 600JD | H20/ 1000 | 497 DB |
| | 0 | 2333 | 95 | 2.5 | | N/A | 1230 | 90 |
| | 0.15 | 2333 | 95 | 2.5 | | 27.2 | 1230 | 90 |
| | 0.25 | 2333 | 95 | 2.5 | | 45.7 | 1230 | 90 |
| | 0.45 | 2333 | 95 | 2.5 | | 83.3 | 1230 | 90 |
| IV | | AFR-700B Note 4 | N/A | N/A | Note 5 | Note 6 | H20/ 1000 | 497 DB |
| | 0 | 2240 | | | | | 1230 | 90 |

Note 1. Flame retardant and high temperature stabilizer may be added in some applications.
Note 2. Arocy M-20 total weight is 66 w/o solids in 90/10 ratio of MEK (methyl ethyl ketone) and naptha solvents.
Note 3. 8:1 weight ratio of MEK and aliphatic naptha.
Note 4. Assume 75 w/o solids.
Note 5. 1:1 ratio methanol and 1-methyl-2,-pyrrolidinone.
Note 6. Dixon's 1110 graphite flakes or hyperions graphics grade BN or CC may be used, if a carbon filler is to be used.
Note 7. A weight ratio of less than 20:1 solvent to carbon filler was used in this formulation, because of the long evaporation times that would have been required. Satisfactory results were obtained, which are believed to be attributable to the large volume of liquid resin in this mixture.

Batches were prepared in accordance with the ingredients of Table I. Each batch was prepared by mixing resin and curing agents with a metal spatula in a can, and then, if the batch recipe requires, adding solvent and carbon filler and then ultrasonically dismembrating for 360 seconds or until the mixture becomes gelatinous. Because of the volumes called for in the above recipes, the above steps were repeated in two different cans, and then the contents of the two cans were added together into a mixer before the microspheres and milled glass (according to the recipe) were added and mixed in two stages, first for 10 minutes at low speed, and then for 15 minutes at low speed. Then, at least 25 in. Hg vacuum was applied, while mixing at low speed. An average of five cured specimens per each batch from an average of three batches of each composition were tested for physical properties at room temperature. Some of the batches tested were loaded, while others were unloaded. Compression strength for each type of foam was tested in accordance with ASTM D-1621, and the failing strength determined in pounds per square inch (psi). It was observed that the compression failure strength was not affected by loading with particulate carbon, and that such materials had substantially the same strength as the unloaded versions. However, the use of carbon fiber is not recommended, if strength is important, because the carbon fibers tend to introduce crack initiation sites into the cured materials.

The compression failure strengths at room temperature (about 75° F.) dry conditions are given in Table II:

TABLE II

| Syntactic Material | F (psi) |
|---|---|
| I | 1270 |
| II | 1200 |
| III | 1430 |
| IV | 700 |

Note that, with the exception of material IV, which is a high-temperature resin known to be somewhat more brittle than the other resins, the compression strength of the syntactic materials exceeds the 90% breakage compression strength of the microspheres used in making up the syntactic foam, indicating that there is a synergy taking place between the microspheres and the resin network. By comparison, "ROHACELL™" WF-200 (Rohmtech Corp., Germany) has a compression strength of only 928 psi, and "HONEYCOMB" HRP 5.5 (Hexcel Corp., Chandler, Ariz.) has a compression strength of 875 psi.

In view of the above, it will be seen that the several advantages of the invention are achieved and other advantageous results attained.

As various changes could be made in the above methods and compositions without departing from the scope of the invention, it is intended that all matter contained in the above description and shown in the accompanying drawings shall be interpreted as illustrative and not in a limiting sense.

While the present invention has been described by reference to a specific embodiment, it should be understood that modifications and variations of the invention may be constructed without departing from the scope of the invention defined in the claims appearing at the end of this specification.

APPENDIX

An indication of the commercial availability of some of the products named in the examples above is provided below in summary form. This list is to be understood as being exemplary only, and is not intended to limit the invention in any way.

Methyl ethyl ketone (MEK), commercially available.

Aliphatic naptha, commercially available.

1-Methyl-2-pyrrolidinone, Aldrich, Milwaukee, Wis.

EPON 828, modified epoxy resin, Shell Chemical Co., Houston, Tex.

EPON 9420 resin, Shell Chemical Co., Houston, Tex.

Epon 9470 an aromatic diamine solution epoxy resin curative, Shell Chemical Co., Houston, Tex.

DEAPA curing agent (3-diethylaminopropylamine), Aldrich Chemical Co., Inc., Milwaukee, Wis.

AroCy® M-20 cyanate ester resin (low molecular weight coprepolymer, ref. U.S. Pat. No. 4,740,584), Ciba Geigy, Hawthorne, N.Y.

Dinony-Phenol 75132-DNP-F, Texaco Chemical Co., Houston, Tex.

Polyimide resin AFR-700B Hycomp AMSPEC Chemical Corp., Gloucester City, N.J.

Cobatic acetylacetonate (CO AC AC) CAS 21679-46-9.

Scotchlite H20/1000 Glass Microbubbles, 3M Company, St. Paul, Minn.

FTD 200 Glass Microspheres, Grace, Canton, Mass.

EC 600JD Ketjen Black carbon particles, Akzo Chemicals, Chicago, Ill.

No. 497 DB ⅛ inch milled D-glass fibers, Owens Corning Fiberglass, Dallas, Tex.

Graphite fibrils, grade BN or CC, Hyperion Catalysis International, Cambridge, Mass.

AFR-700 resin, a polyimide precursor solution (PMR-II) including 30–60%/weight methanol and 7–13%/weight 1,4-Benzenediamine, Dexter Composites Division, Cleveland, Ohio.

What we claim is:

1. A method for preparing a readily conformable, B-staged, low density syntactic foam-core composite comprising the steps of:

a) combining a resin, a first portion of a solvent for the resin, and a plurality of microspheres to form a slurry in which the resin, solvent, and microspheres are substantially uniformly dispersed;

b) forming a measured amount of the slurry into a sheet;

c) heating the sheet to a temperature between about $T_{vmin}$ −20° F. and $T_{vmin}$ for a period of time between about $t_{vmin}$ −15 minutes and $t_{vmin}$ to partially cure the resin to a point approaching but not beyond minimum viscosity, where $T_{vmin}$ and $t_{vmin}$ represent a point at which the resin reaches a minimum viscosity as a function of time and temperature; and d) cooling the sheet by placing it in an environment having a temperature not greater than room temperature.

2. A method for preparing a readily conformable, B-staged, low density syntactic foam-core composite comprising the steps of:

a) combining a resin, a first portion of a solvent for the resin, and a plurality of microspheres to form a slurry in which the resin, solvent, and microspheres are substantially uniformly dispersed;

b) forming a measured amount of the slurry into a sheet;

c) heating the sheet to partially cure the resin to a point approaching but not beyond minimum viscosity by heating the resin to 190° F. for between 30 minutes and two hours; and d) cooling the sheet by placing it in an environment having a temperature not greater than room temperature.

3. The method of claim 1 wherein the step of heating the sheet to partially cure the resin comprises the steps of determining a point at which viscosity of the resin reaches a minimum as a function of time and temperature, wherein the determined time is represented by $t_{vmin}$ and the determined temperature is represented by $T_{vmin}$, and heating the sheet for a time between about $t_{vmin}$ −15 to $t_{vmin}$ minutes at a temperature of between about $T_{vmin}$ −10° F. and $T_{vmin}$.

4. The method of claim 1 wherein the step of cooling the sheet comprises the step of aging the sheet at room temperature for between 15 minutes and 12 hours.

5. The method of claim 4 wherein the step of cooling the sheet comprises the step of aging the sheet at room temperature for 12 hours.

6. The method of claim 4 wherein the step of heating the sheet to partially cure the resin comprises the steps of determining a point at which viscosity of the resin reaches a minimum as a function of time and temperature, wherein the determined time is represented by $t_{vmin}$ and the determined temperature is represented by $T_{vmin}$, and heating the sheet for a time between about $t_{vmin} -15$ to $t_{vmin}$ minutes at a temperature of between about $T_{vmin} -10°$ F. and $T_{vmin}$.

7. The method of claim 1 wherein the step of cooling the sheet comprises the step of aging the sheet at a temperature of $-20°$ F. for at least 12 hours.

8. The method of claim 7 wherein the step of heating the sheet to partially cure the resin comprises the steps of determining a point at which viscosity of the resin reaches a minimum as a function of time and temperature, wherein the determined time is represented by $t_{vmin}$ and the determined temperature is represented by $T_{vmin}$, and heating the sheet for a time between about $t_{vmin} -15$ to $t_{vmin}$ minutes at a temperature of between about $T_{vmin} -10°$ F. and $T_{vmin}$.

9. The method of claim 7 and further comprising the step of storing the aged material for a period greater than one week prior to final cure.

10. The method of claim 1 wherein the combining step comprises mixing together between 50 and 60 parts by weight total solids content of resin, between 35 to 43 percent total solids content of microspheres, and between 7 to about 10 parts total solids content by weight of solvent before removal of solvent.

11. The method of claim 10 wherein the combining step comprises mixing together between 53 and 58 parts by weight total solids content of resin, between 39 and 42 parts by weight total solids content of microspheres, and between 7 to 10 parts solvent by weight of total solids.

12. The method of claim 11 wherein the combining step comprises mixing together 56 parts by weight of resin, 41 parts by weight of microspheres, and 8 parts by weight of total solids content of solvent.

13. The method of claim 10 wherein the combining step comprises the steps of:

preparing a separate mixture of a second portion of a solvent for the resin and a quantity of electromagnetic filler material;

adding the separate mixture to a mixture of the resin, and the first portion of a solvent for the resin to form a loaded mixture;

dismembrating the loaded mixture; and adding the plurality of microspheres to the dismembrated loaded mixture to form the slurry.

14. The method of claim 13 wherein the step of preparing the separate mixture comprises the step of mixing the second portion of the solvent for the resin and the quantity of electromagnetic filler material in a ratio of 20:1 by weight.

15. The method of claim 14 and further comprising the step of dismembrating the separate mixture of the second portion of the solvent for the resin and the quantity of electromagnetic filler material.

16. The method of claim 15 wherein the dismembrating steps include ultrasonically deaglomerating the electromagnetic particles for between 90 seconds and 6 minutes.

17. The method of claim 16 wherein the electromagnetic filler material comprises carbon particles, and the dismembrating steps produces chains of between 7 and 10 carbon particles that interlock and cross one another to form a network.

18. The method of claim 15 wherein the electromagnetic filler material comprises carbon particles, and the step of dismembrating the separate mixture is continued until the separate mixture has a gelatinous texture.

19. The method of claim 13 wherein the electromagnetic filler comprises not more than 12 parts by weight of total solids content of the composite.

20. The method of claim 10 wherein the combining step comprises the steps of:

preparing a separate mixture of a second portion of a solvent for the resin and a quantity of electromagnetic filler material;

dismembrating the separate mixture;

adding the dismembrated separate mixture to a mixture of the resin and the first portion of a solvent for the resin to form a loaded mixture;

adding the plurality of microspheres to the loaded mixture to form the slurry.

21. The method of claim 20 wherein the dismembrating steps include ultrasonically deaglomerating the electromagnetic particles for between 90 seconds and 6 minutes.

22. The method of claim 21 wherein the electromagnetic filler material comprises carbon particles, and the dismembrating steps produces chains of between 7 and 10 carbon particles that interlock and cross one another to form a network.

23. The method of claim 21 wherein the electromagnetic filler material comprises carbon particles, and the step of dismembrating the separate mixture is continued until the separate mixture has a gelatinous texture.

24. The method of claim 21 wherein the electromagnetic filler comprises not more than 12 parts by weight of total solids content of the composite.

* * * * *